United States Patent
Ruckstuhl

(10) Patent No.: US 7,324,503 B2
(45) Date of Patent: Jan. 29, 2008

(54) METHOD FOR PROVIDING TELEPHONE SERVICES THROUGH XDSL CONNECTION LINES

(75) Inventor: Hanspeter Ruckstuhl, Wolfratshausen (DE)

(73) Assignee: Siemens Aktiengesellschaft, Munich (DE)

(*) Notice: Subject to any disclaimer, the term of this patent is extended or adjusted under 35 U.S.C. 154(b) by 1027 days.

(21) Appl. No.: 10/239,302

(22) PCT Filed: Mar. 21, 2001

(86) PCT No.: PCT/DE01/01084

§ 371 (c)(1),
(2), (4) Date: Sep. 20, 2002

(87) PCT Pub. No.: WO01/71993

PCT Pub. Date: Sep. 27, 2001

(65) Prior Publication Data

US 2004/0013108 A1    Jan. 22, 2004

(30) Foreign Application Priority Data

Mar. 21, 2000 (DE) ................. 100 13 866

(51) Int. Cl.
    *H04L 12/66* (2006.01)
(52) U.S. Cl. ........................ 370/352; 370/353
(58) Field of Classification Search ............ None
    See application file for complete search history.

(56) References Cited

U.S. PATENT DOCUMENTS

| | | | | |
|---|---|---|---|---|
| 6,804,224 B1* | 10/2004 | Schuster et al. | ............ | 370/352 |
| 6,826,173 B1* | 11/2004 | Kung et al. | ................. | 370/352 |
| 6,856,676 B1* | 2/2005 | Pirot et al. | ............. | 379/201.01 |
| 7,006,489 B2* | 2/2006 | Li et al. | ...................... | 370/352 |
| 7,075,918 B1* | 7/2006 | Kung et al. | ................. | 370/352 |

* cited by examiner

*Primary Examiner*—Phirin Sam
(74) *Attorney, Agent, or Firm*—Bell, Boyd & Lloyd

(57) ABSTRACT

The inventive method uses a VoIP server which provides the classical subscriber performance features of an exchange, and a VoIP client in the integrated access device (IAD) of the subscriber. The VoIP server uses a known VoIP signalling protocol for controlling the VoIP voice transmission between the VoIP client in IAD and the media gateway and for tunneling the PSTN/ISDN signalling between the VoIP client in the IAD and the VoIP server.

4 Claims, 3 Drawing Sheets

VoDSL based on VoIPoATM and PSTN/ISDN Tunneling

METHOD FOR PROVIDING TELEPHONE SERVICES THROUGH XDSL CONNECTION LINES

CLAIM FOR PRIORITY

This application claims priority to International Application No. PCT/DE01/01084 which was published in the German language on Sep. 27, 2001.

TECHNICAL FIELD OF THE INVENTION

The invention relates to a method for making telephony services available by way of xdsl connection lines.

BACKGROUND OF THE INVENTION

In general, packet-oriented methods are used for VODSL, in order to be able to offer the known telephony services (ISDN or analog) by way of xDSL lines. Methods known up to the present are:

I. Broadband Loop Emulation Services (BLES)

This solution is shown in FIG. 1. In this method, the subscriber signaling protocols (e.g., GR303, V5, ISDN) and the voice channel are transparently carried by a conventional subscriber switching center (Tln-Vst) to the line termination in the Integrated Access Device (IAD) at the end customer location, by way of the packet-oriented access network. In most cases, ATM/AAL2 is used as the transport protocol for the transmission of signal and voice. Other transport protocols, e.g., FR or IP, would also be conceivable.

Disadvantages of this solution approach are, among others:
  Complicated, error-prone operation, because the subscriber must be set up twice, once at the subscriber switching center and again in the AN.
  Restriction to voice services, i.e., cannot be expanded to multi-media, in spite of the use of a packet-oriented network.

Advantages of this solution method are, among others:
Assuring conventional telephony services and subscriber terminations, conventional terminals can continue to be used without restrictions.
The quality of service (QOS) required for the telephony service is assured by using a dedicated ATM-PVC in the access network and TDM in the subscriber switching center.

II. Voice Over Multi-Service Data Networks (VOMSDN)

This solution is shown in FIG. 2. This method is based on VoIP and utilizes the corresponding protocols, e.g., H323, SIP, MGCP. Access to the conventional PSTN no longer takes place by way of a subscriber switching center, but rather by way of a transit switching center. VoIP controller and media gateway take over the interworking function with regard to signaling (H.323, SIP <-> ISUP) and working channel (VoIP <-> TDM).

Disadvantages of this solution method are, among others:
  The quality of service (QOS) required for telephony service cannot be assured, since voice, signaling, and data packets are transported by way of the same ATM connection.
  The VoIP telephony service being offered is not identical with conventional telephony service—conventional terminals can only be used within limitations.

Advantages of this solution method are, among others:
  The possibility of using LANs as a distribution network also for telephony services, at the end customer location.
  Expandability to multi-media services, particularly when using H.323 or SIP.

Alternative local network operators (e.g., COLT) who want to serve end customers directly must introduce new access technologies or lease the subscriber access line from the former market controller (e.g., Deutsche Telekom). The monthly leasing costs in this connection are in the range of the basic subscriber fee for conventional telephony service, so that the alternative local network operator must offer additional services by way of the leased subscriber access line, in order to be profitable.

These additional services are based on the xDSL technology and increasingly consist of Voice_over_DSL (VODSL), in addition to broadband Internet access. Using VODSL, the broadband xDSL technology is utilized to make up to 16 subscriber connections for lucrative telephony services (ISDN or analog) available to the end customer, by way of one connection line. The target group for VODSL services is primarily small to medium-size businesses.

SUMMARY OF THE INVENTION

In one embodiment of the invention, there is a method for making telephony services available by way of xDSL connection lines. The method includes, for example, providing a transport protocol connection for the voice channel, and another transport protocol connection is used for the signaling to implement a telephony service, controlling the voice transmission between the IAD and the MG, using VoIP signaling, and for transparent transmission of the PSTN/ISDN signaling between the IAD and the VoIP controller, converting voice between VoIP and TDM using a media gateway, providing a VoIP controller to a) handle the PSTN/ISDN signaling, b) terminate the VoIP signaling protocol and for tunneling of the PSTN/ISDN signaling, and c) control the media gateway, and providing an xDSL access device to a) terminate the two ATM connections for voice and signaling, b) convert the voice transmission between VoIP and the terminal connection, c) terminate the VoIP signaling protocol and for tunneling of the PSTN/ISDN signaling, and d) bringing together the voice and PSTN/ISDN signaling and the terminal connection for the subscriber terminals connected with the xDSL access device is operated.

In another embodiment of the invention, there is a telephony service system. The system includes, for example, a VoIP server to provide conventional subscriber features of a subscriber switching center available, an xDSL access device that includes at least one subscriber connection, and that converts the VoIP voice and the PSTN/ISDN signaling tunneled by way of the VoIP signaling protocol to the conventional voice transmission and signaling methods at a subscriber connection, and a media gateway to convert the voice between VoIP and TDM, wherein the VoIP server configured to use a known VoIP signaling protocol to control the VoIP voice transmission between the xDSL access device and the media gateway and for tunneling the PSTN/ISDN signaling between the xDSL access device and the VoIP server.

In a further embodiment of the invention, there is a VoIP server to provide conventional subscriber features of a subscriber switching center available, and that is configured to use a known VoIP signaling protocol to control the VoIP voice transmission between an xDSL access device and a media gateway, and for tunneling a PSTN/ISDN signaling between the VoIP server and the xDSL access device.

In yet another embodiment of the invention, there is an xDSL access device to terminate two transport protocol connections for voice and signaling, convert voice transmission between VoIP and a terminal connection, terminate a VoIP signaling protocol and use it for tunneling the PSTN/ISDN signaling, and bring the voice and PSTN/ISDN signaling together and operate the terminal connection for subscriber terminals.

In still another embodiment of the invention, there is a media gateway to convert voice between VoIP and TDM and which is controlled by a VoIP controller such that a TDM output of a media gateway is carried to the VoIP controller.

DETAILED DESCRIPTION OF THE PREFERRED EMBODIMENTS

Figure 1:
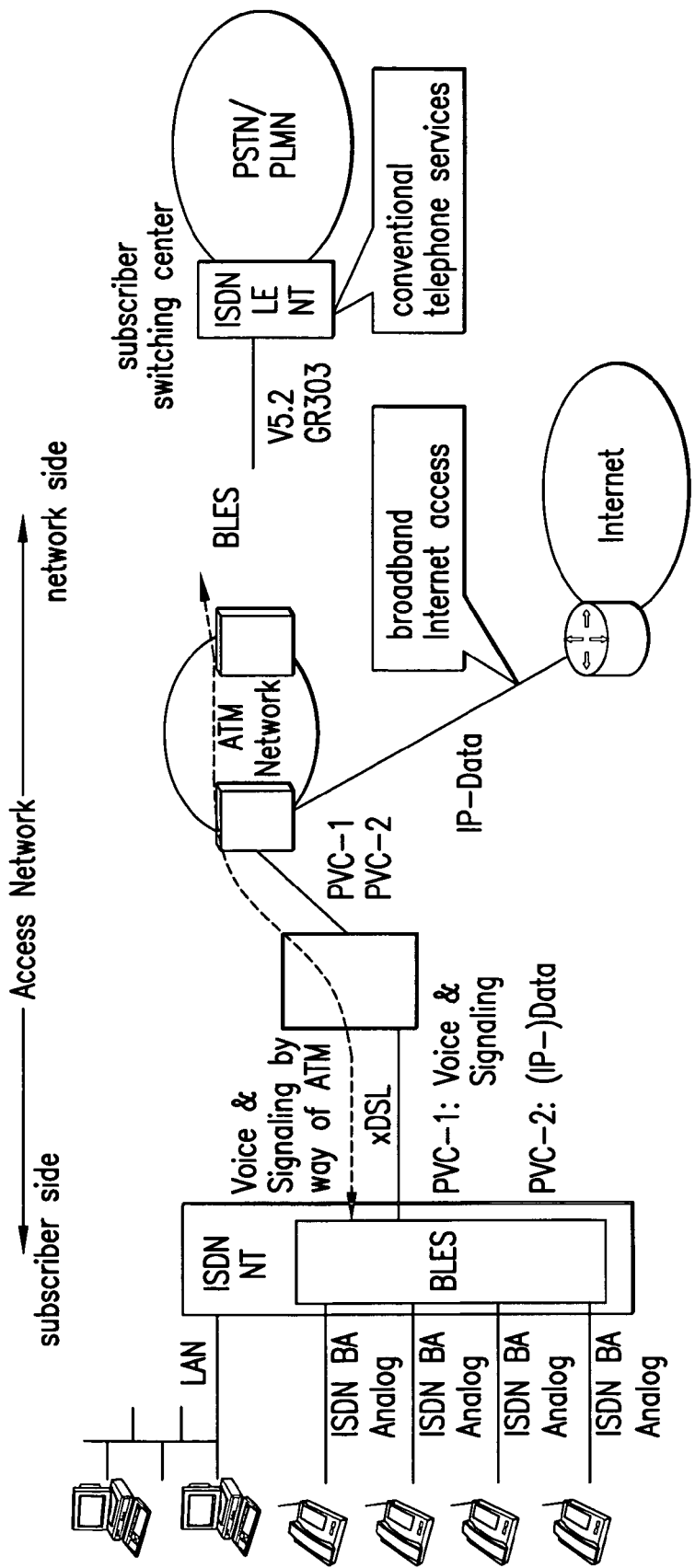
FIG. 1 illustrates a broadband loop emulation service.
Figure 2:
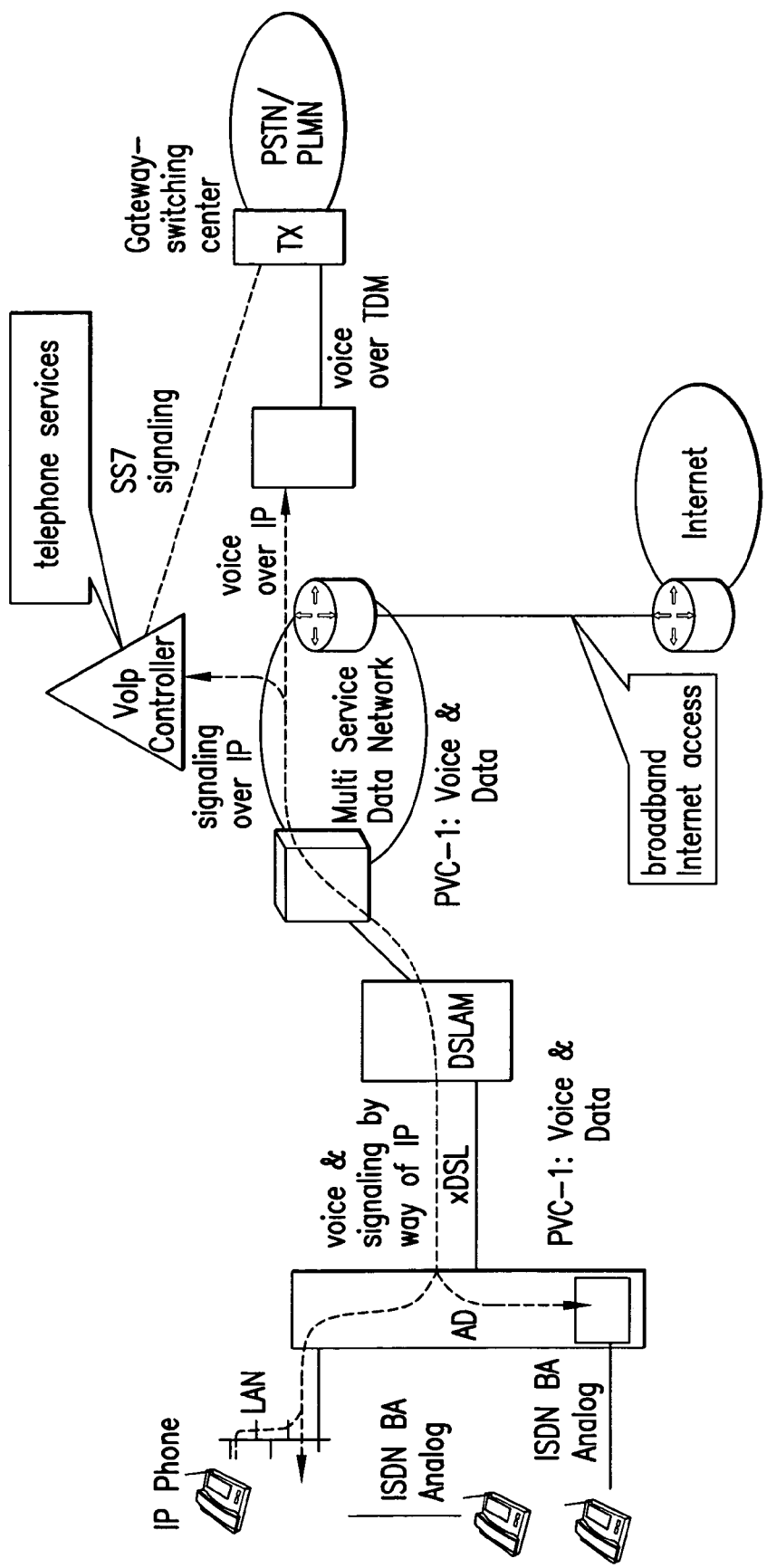
FIG. 2 illustrates a voice over multi-service data networks.
Figure 3:
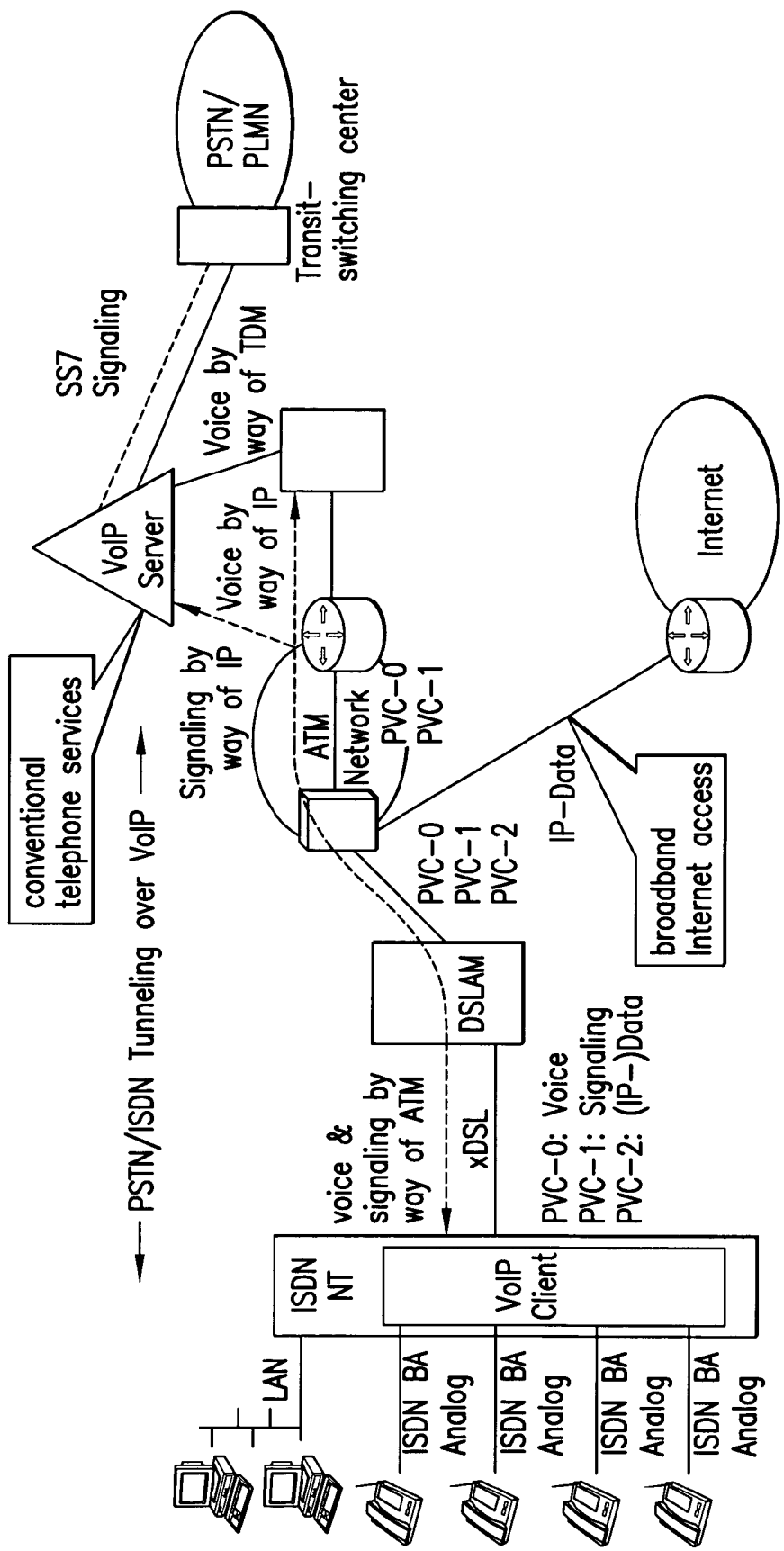
FIG. 3 illustrates a method according to the invention.

FIG. 3 shows a method according to the invention. The method according to the invention combines the advantages of the known solution methods, while avoiding the specific disadvantages. It can be used in combination with any DSLAMs that are used to make the xDSL access available, and has little to no influence on the broadband Internet access of the telephone customer.

One embodiment according to the invention uses a VoIP server that makes the conventional subscriber features of an LE available, and a VoIP client in the IAD. The VoIP server uses a known VoIP signaling protocol (H.323, SIP, etc.) to control the VoIP voice transmission between the VoIP client in the IAD and the MG, and for tunneling the PSTN/ISDN signaling between the VoIP client in the IAD and the VoIP server. The VoIP client in the IAD converts the VoIP voice and the PSTN/ISDN signaling tunneled by way of the VoIP signaling protocol to the conventional voice transmission and signaling methods at the subscriber connection of the IAD (ISDN, analog).

The embodiment, according to the invention, for making conventional telephony services available by way of VoIP by way of xDSL connection lines is characterized, but limited, by the following elements:

1. The use of two dedicated ATM connections (PVC or SVC) for a) the voice channel; and b) the signaling. In this way, the QOS required for telephony services is assured, on the one hand, and voice and signaling can be carried to different network elements, on the other hand.
2. The use of VoIP signaling (H.323, SIP, etc.) for controlling voice transmission between the IAD and the MG, on the one hand, and for transparent transmission of the PSTN/ISDN signaling (tunneling) between the IAD and the VoIP controller, on the other hand.
3. The use of an MG for converting the voice between VoIP and TDM. This MG is controlled by the VoIP controller. With regard to the wiring of the TDM output of the MG, two configurations are possible.
   3a. The TDM output of the MG is carried to the VoIP controller. In this configuration, the TDM bearer is processed by the VoIP controller. The advantage of this solution is that a simple (trunking) MG can be used, which is able to handle conversion of the language between the VoIP and the TDM, but does not necessarily require special functions to support subscriber services.
   3b. The TDM output of the MG is carried directly to the overriding switching center. In this configuration, the TDM bearer is not processed directly by the VoIP controller. Therefore, the MG should also be able to handle functions to support subscriber services, in addition to conversion of the language between the VoIP and the TDM. These are, among others, recognition, feed of tones and announcements, support of multi-channel connections. In addition, the complexity of the MG control protocol is correspondingly greater in this configuration.
4. The use of a VoIP controller that a) includes the subscriber data (telephone number, services, etc.), b) handles the PSTN/ISDN signaling, c) determines the call rating data, d) terminates the VoIP signaling protocol and uses it for tunneling of the PSTN/ISDN signaling, e) controls the MG and, if necessary, f) processes the TDM voice channel.
5. The use of a VoIP client integrated in the IAD that a) terminates the two ATM connections (SVC or PVC) for voice and signaling, b) converts voice transmission between VoIP and the terminal connection (ISDN or analog), c) terminates the VoIP signaling protocol and uses it for tunneling of the PSTN/ISDN signaling, and d) brings the voice and PSTN/ISDN signaling together and thereby operates the terminal connection for ISDN or analog subscriber terminals at the IAD.

The invention makes telephony services available by way of VoIP by way of xDSL connection lines, which is characterized by:

QOS for telephony services by separation of voice and signaling, thanks to dedicated ATM connections (PVC or SVC) for voice transmission (VoIPoATM) and signaling (H.323, SIP, etc.) between the IAD and the VoIP controller or media gateway.

VoIP controller and corresponding VoIP client in the IAD for tunneling of the PSTN/ISDN signaling by means of VoIP signaling (H.323, SIP, etc.) and control of the voice transmission by way of VoIP.

Use of a simple (trunking) MG, controlled by the VoIP controller, to convert the working channel between VoIP (for transport by way of ATM and xDSL) and TDM (for processing in the VoIP controller and connection to conventional switching centers).

Abbreviations used:

AN: Access Network

DSL: Digital Subscriber Line

DSLAM: DSL Access Module

FR: Frame Relay

IAD: Integrated Access Device

IP: Internet protocols

LE, Tl-Vst: subscriber switching center (Local Exchange)

MG: Media Gateway

PVC: Permanent Virtual Connection

SVC: Switched Virtual Circuit

VST, Vst: switching center

VoIP: Voice over IP

The invention claimed is:

1. A method for making telephony services available by way of xDSL connection lines, comprising:
   providing a transport protocol connection for the voice channel, and another transport protocol connection is used for the signaling to implement a telephony service;
   controlling the voice transmission between the IAD and the MG, using VoIP signaling, and for transparent transmission of the PSTN/ISDN signaling between the IAD and the VoIP controller;
   converting voice between VoIP and TDM using a media gateway;
   providing a VoIP controller to handle the PSTN/ISDN signaling, terminate the VoIP signaling protocol and for tunneling of the PSTN/ISDN signaling, and control the media gateway; and
   providing an xDSL access device to terminate the two ATM connections for voice and signaling, convert the voice transmission between VoIP and the terminal connection, terminate the VoIP signaling protocol and for tunneling of the PSTN/ISDN signaling, and bringing together the voice and PSTN/ISDN signaling and the terminal connection for the subscriber terminals connected with the xDSL access device is operated.

2. A telephony service system, comprising:
   a VoIP server to provide conventional subscriber features of a subscriber switching center available;
   an xDSL access device that includes at least one subscriber connection, and that converts the VoIP voice and the PSTN/ISDN signaling tunneled by way of the VoIP signaling protocol to the conventional voice transmission and signaling methods at a subscriber connection; and
   a media gateway to convert the voice between VoIP and TDM, wherein
   the VoIP server is configured to use a known VoIP signaling protocol to control the VoIP voice transmission between the xDSL access device and the media gateway and for tunneling the PSTN/ISDN signaling between the xDSL access device and the VoIP server.

3. A VoIP server to provide conventional subscriber features of a subscriber switching center available, and that is configured to use a known VoIP signaling protocol to control the VoIP voice transmission between an xDSL access device and a media gateway, and for tunneling a PSTN/ISDN signaling between the VoIP server and the xDSL access device, wherein the xDSL access device converts the VoIP voice and the PSTN/ISDN signaling tunneled by the VoIP signaling protocol a conventional voice transmission and signaling methods at a subscriber connection.

4. An xDSL access device to terminate two transport protocol connections for voice and signaling, convert voice transmission between VoIP and a terminal connection, terminate a VoIP signaling protocol and use it for tunneling the PSTN/ISDN signaling between a VoIP server and the xDSL access device, and bring the voice and PSTN/ISDN signaling together and operate the terminal connection for subscriber terminals, wherein the VoIP server provides conventional subscriber features of a subscriber switching center and uses known VoIP signaling protocol to control the VoIP voice transmission.

* * * * *